United States Patent
Kinoshita et al.

(10) Patent No.: US 10,460,872 B2
(45) Date of Patent: Oct. 29, 2019

(54) ELECTRONIC DEVICE

(71) Applicant: Panasonic Intellectual Property Management Co., Ltd., Osaka (JP)

(72) Inventors: Takahiko Kinoshita, Toyama (JP); Toshihisa Miura, Toyama (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 1 day.

(21) Appl. No.: 15/992,362

(22) Filed: May 30, 2018

(65) Prior Publication Data
US 2018/0277303 A1 Sep. 27, 2018

Related U.S. Application Data

(63) Continuation of application No. PCT/JP2016/005025, filed on Nov. 30, 2016.

(30) Foreign Application Priority Data

Dec. 25, 2015 (JP) .................. 2015-253886

(51) Int. Cl.
| | |
|---|---|
| *H01G 2/04* | (2006.01) |
| *H01G 2/10* | (2006.01) |
| *H01G 4/224* | (2006.01) |
| *H01G 4/228* | (2006.01) |
| *H01G 13/00* | (2013.01) |

(52) U.S. Cl.
CPC .................. *H01G 2/04* (2013.01); *H01G 2/10* (2013.01); *H01G 4/224* (2013.01); *H01G 4/228* (2013.01); *H01G 13/00* (2013.01)

(58) Field of Classification Search
CPC ............ H01G 9/10; H01G 9/008; H01G 9/02; H01G 9/045; H01G 9/145; H01G 2009/0408; H01G 2/04; H01G 2/10; H01G 4/224; H01G 4/228; H01G 13/00
USPC .................................. 361/328, 517
See application file for complete search history.

(56) References Cited

U.S. PATENT DOCUMENTS 9,255,716 B2 * 2/2016 Koga .................... F24F 1/0007

FOREIGN PATENT DOCUMENTS

JP 2006-216756 8/2006

OTHER PUBLICATIONS

International Search Report of PCT application No. PCT/JP2016/005025 dated Feb. 14, 2017.

* cited by examiner

*Primary Examiner* — Michael P McFadden
(74) *Attorney, Agent, or Firm* — McDermott Will & Emery LLP

(57) ABSTRACT

An electronic device includes a case, a device element housed in the case, and a filling resin with which the case is filled so as to embed the device element in the filling resin. The device element includes a fixing portion that fixes the device element to the case. The case has a support portion that supports the fixing portion, the support portion having an upper surface which faces a lower surface of the fixing portion. The fixing portion and the support portion are in contact with each other at two contact portions A non-contact region where the fixing portion and the support portion are not in contact with each other is provided between the lower surface and the upper surface. At least a part of lower surface is inclined with respect to a bottom surface of the case. The non-contact region is embedded in the filling resin.

6 Claims, 8 Drawing Sheets

ELECTRONIC DEVICE

RELATED APPLICATIONS

This application is a continuation of the PCT International Application No. PCT/JP2016/005025 filed on Nov. 30, 2016, which claims the benefit of foreign priority of Japanese patent application No. 2015-253886 filed on Dec. 25, 2015, the contents all of which are incorporated herein by reference.

TECHNICAL FIELD

The present disclosure relates to an electronic device used in various electronic equipment, electric equipment, industrial equipment, electric components in automobiles, and the like.

BACKGROUND

Recently, electronic devices including film capacitors have been actively developed for enhancing the downsizing, the acquisition of high performances, and the reduction of manufacturing cost. Among these electronic devices, electronic devices which are used as electric components for automobiles or the like are used in a severe environment such as a wide temperature range and high humidity. Accordingly, in order to suppress the deterioration of performances and functions of the electronic devices due to a change in temperature or high humidity, an electronic device where a device element is housed in a case made of metal, plastic or the like, and the case is filled with a resin such that the device element is embedded has been developed. Further improvement of such a technique has been in progress.

A conventional film capacitor has been described with reference to the drawings.

FIG. 9A and FIG. 9B are perspective views illustrating the configuration of the conventional film capacitor where a capacitor element is housed in a case. FIG. 10 is a schematic view illustrating a cross section of a portion surrounded by circle B illustrated in FIG. 9B by cutting the conventional film capacitor in a direction indicated by arrow C.

As illustrated in FIG. 9A and FIG. 9B, film capacitor 121 is configured such that capacitor element 122 is housed in case 140. Capacitor element 122 includes terminal 124 and terminal 125, which have different polarities from each other for connecting with an external mounting body, in a plurality of winding bodies 123 formed by winding a metallized film or in a plurality of stacked bodies formed by stacking metallized films. And capacitor element 122 is embedded by filling resin 127 except for portions of terminals 124, 125 to be connected with the external mounting body.

Capacitor element 121 is fixed to a predetermined portion in case 140 by placing fixing portion 128 (only a left end of fixing portion 128 is illustrated in FIG. 9B) of capacitor element 122 on support portion 141 formed at an upper end portion of a side wall of case 140 as illustrated in FIG. 10.

As described above, by housing the capacitor element in the case and filling the case with the resin, it is possible to suppress the deterioration of performance and a function of the film capacitor even in a severe environment for use.

As information on prior art literature relevant to the disclosure of this application, for example, Unexamined Japanese Patent Publication No. 2006-216756 is known.

SUMMARY

An electronic device according to the present disclosure is an electronic device that includes a case, a device element housed in the case, and a filling resin with which the case is filled so as to embed the device element in the filling resin. The device element includes a fixing portion that fixes the device element to the case. The case has a support portion that supports the fixing portion, the support portion having an upper surface which faces a lower surface of the fixing portion. The fixing portion and the support portion are in contact with each other at two contact portions in the lower surface of the fixing portion, the two contact portions sandwiching a lengthwise center portion of the lower surface of the fixing portion. A non-contact region where the fixing portion and the support portion are not in contact with each other is provided between the lower surface of the fixing portion and the upper surface of the support portion, other than the two contact portions. At least a part of lower surface of the fixing portion is inclined with respect to a bottom surface of the case. The non-contact region is embedded in the filling resin.

With such a configuration, an electronic device having excellent size accuracy and excellent strength can be provided.

DESCRIPTION OF EMBODIMENTS

Figure 1A:
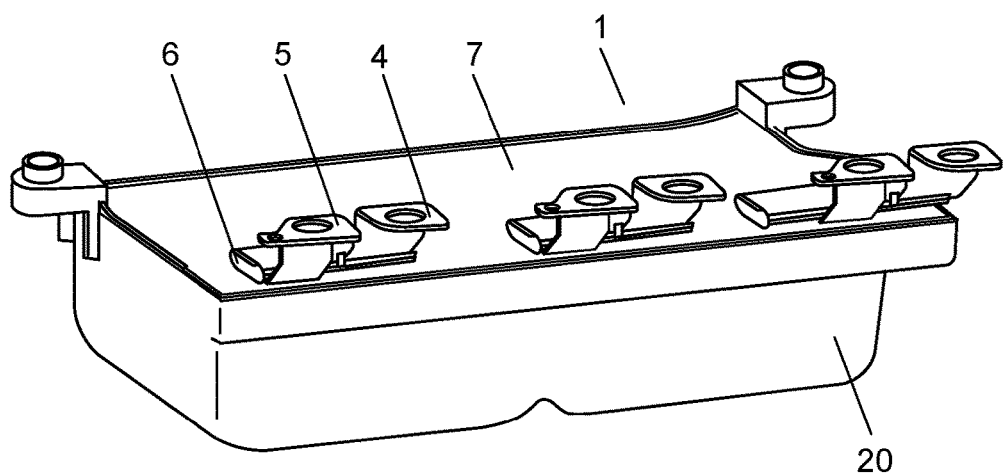
FIG. 1A is a perspective view illustrating an external appearance of a film capacitor according to a first exemplary embodiment of the present disclosure.

In the conventional film capacitor having the above-mentioned configuration, however, support portion 141 formed at an upper end portion of a side wall of case 140 and fixing portion 128 of capacitor element 122 are provided such that an entire upper surface of support portion 141 and an entire lower surface of fixing portion 128 are brought into contact with each other. Accordingly, in a case where a very small projection such as a burr exists in a portion of the upper surface of support portion 141 or a portion of the lower surface of fixing portion 128, or in a case where warping occurs on the upper surface of support portion 141 or the lower surface of fixing portion 128, fixing portion 128 cannot be placed on support portion 141 in a stable manner depending on a portion where the projection exists even when the projection is very small or depending on a warping direction. As a result, a fixing strength of capacitor element 122 in case 140 is lowered, and terminals 124, 125 connected to capacitor element 122 in case 140 or the external mounting body are displaced from a predetermined position. Accordingly, there are problems such as early deterioration of performance or impossibility of fixing the conventional film capacitor to the external mounting body.

The present disclosure has been made to overcome such problems of the prior art, and the present disclosure provides an electronic device having excellent size accuracy and excellent strength.

Exemplary embodiments of the present disclosure will now be described with reference to drawings. The present disclosure, however, should not be limited to the exemplary embodiments.

First Exemplary Embodiment

Figure 1B:
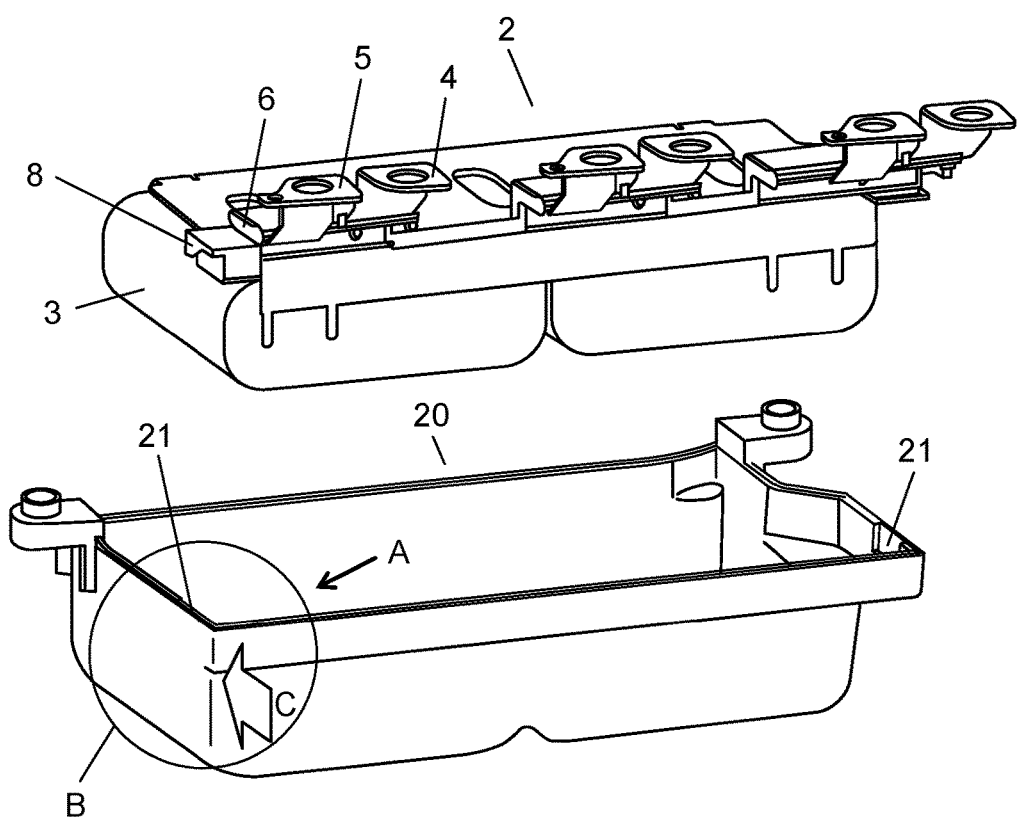
FIG. 1B is a perspective view illustrating a configuration of a capacitor element and a case according to the first exemplary embodiment of the present disclosure.
Figure 2:
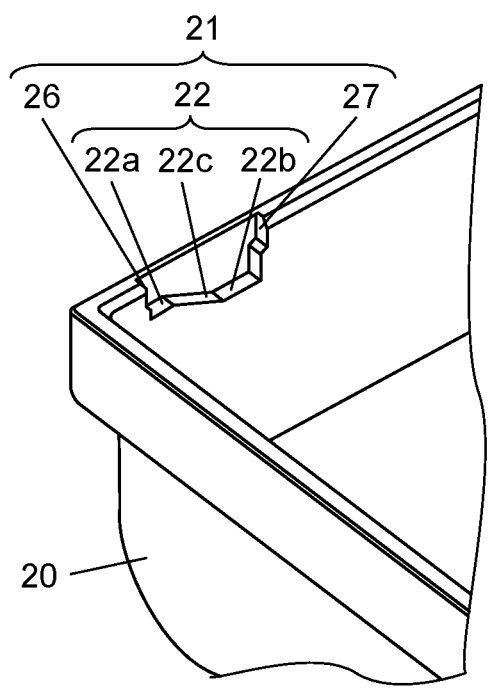
FIG. 2 is a view illustrating a part of the case surrounded by circle B illustrated in FIG. 1B as viewed in a direction indicated by arrow A.
Figure 3:
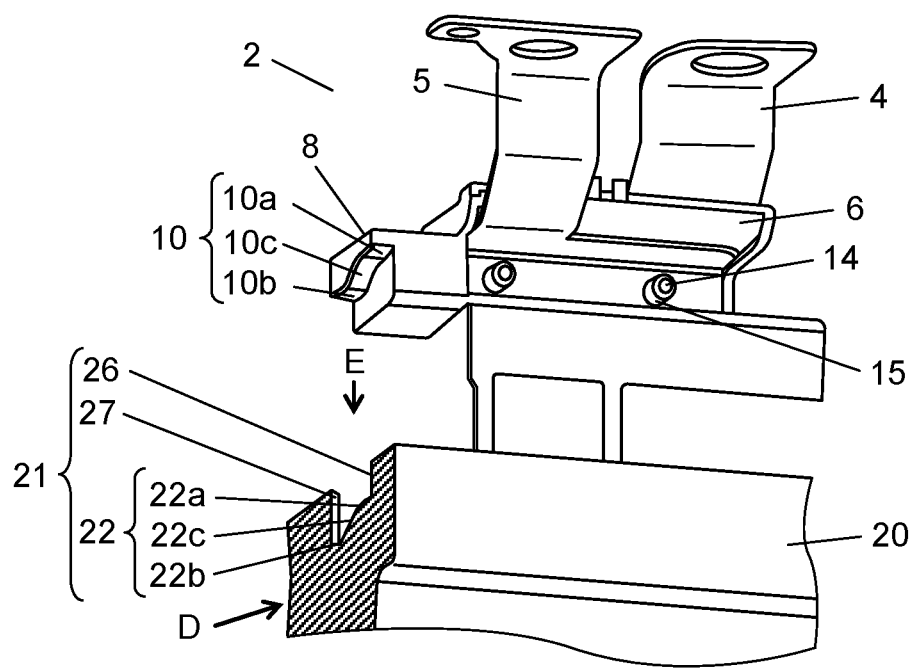
FIG. 3 is a view illustrating a cross section of the case obtained by cutting a part of the case surrounded by circle B illustrated in FIG. 1B in a direction indicated by arrow C, and a fixing portion of the element.
Figure 4:
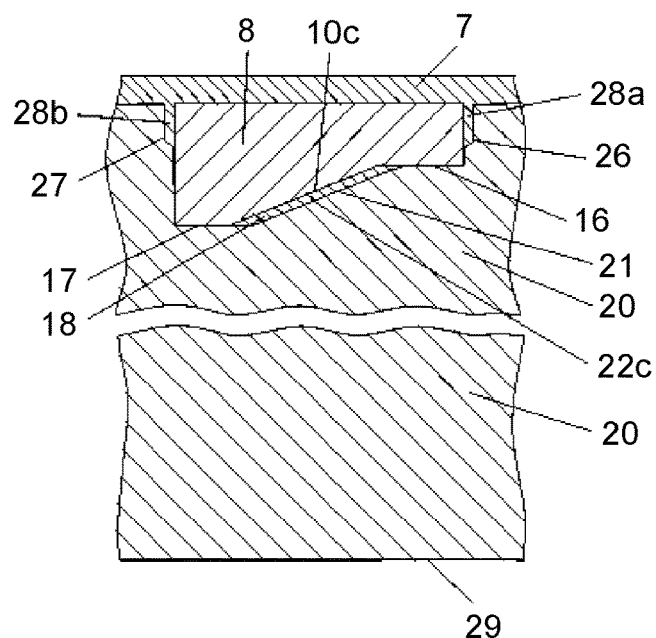
FIG. 4 is a view illustrating a cross section where the fixing portion of the capacitor element illustrated in FIG. 3 is fitted in a support portion of the case as viewed in a direction indicated by arrow D.

FIG. 1A is a perspective view illustrating an external appearance of film capacitor 1 which is an electronic device according to a first exemplary embodiment of the present disclosure. And FIG. 1B is a perspective view illustrating a configuration of capacitor element 2 and case 20 according to the first exemplary embodiment of the present disclosure. FIG. 2 is a view illustrating a part of case 20 surrounded by circle B illustrated in FIG. 1B as viewed in a direction indicated by arrow A. FIG. 3 is a view illustrating a cross section of case 20 obtained by cutting a part of case 20 surrounded by circle B illustrated in FIG. 1B in a direction indicated by arrow C, and fixing portion 8 of capacitor element 2 (wound body 3 formed by winding a metalized film is omitted). FIG. 4 is a view illustrating a cross section where the fixing portion of capacitor element 2 illustrated in FIG. 3 is fitted in support portion 21 of case 20 as viewed in a direction indicated by arrow D.

As illustrated in FIG. 1A and FIG. 1B, film capacitor 1, which is an electronic device, is configured such that capacitor element 2 is housed in case 20 made of metal or a resin. Capacitor element 2 includes, in a plurality of winding bodies 3 formed by winding a metallized film or a plurality of stacked bodies formed by stacking metallized films, terminal 4 and terminal 5 made of metal such as copper and having different polarities for electrical connection with an external mounting body. And capacitor element 2 further includes insulating member 6 made of an insulating resin or the like which is interposed between terminal 4 and terminal 5. Further, case 20 of film capacitor 1 is filled with filling resin 7 such as an epoxy resin or a urethane resin, except for portions of terminals 4, 5 to be connected with the external mounting body. Here, capacitor element 2 is an example of "device element" in this application.

Capacitor element 2 is disposed at a predetermined position in case 20 by fitting fixing portion 8 (only a left end of fixing portion 8 is illustrated in FIG. 1B), which is provided at both end portions of insulating member 6 provided to capacitor element 2, to support portion 21 formed at an upper end portion of a side wall of case 2. Terminals 4, 5 provided to capacitor element 2 are also disposed at predetermined positions in case 20.

As illustrated in FIG. 2 and FIG. 3, support portion 21 formed on case 20 has upper surface 22 which faces lower surface 10 of fixing portion 8.

As illustrated in FIG. 3 and FIG. 4, fixing portion 8 is fitted in support portion 21 in a direction indicated by arrow E. Lower surface 10*a* at one end side of lower surface 10 of fixing portion 8 and upper surface 22*a* at one end side of support portion 21 are in direct contact with each other at contact portion 16, and lower surface 10*b* at the other end side of lower surface 10 of fixing portion 8 and upper surface 22*b* at the other end side of support portion 21 are in direct contact with each other at contact portion 17. Two contact portions, that is, contact portion 16 and contact portion 17 are positioned so as to sandwich a lengthwise center portion of the lower surface of fixing portion 8 (lengthwise means a lateral direction in FIG. 4). And a region sandwiched between two contact portions 16, 17 is non-contact region 18 where lower surface 10*c* of fixing portion 8 and upper surface 22*c* of support portion 21 are not in direct contact with each other.

Lower surface 10*c* of fixing portion 8 which defines non-contact region 18 is inclined with respect to bottom surface 29 of case 20.

Upper surface 22 of support portion 21 which faces lower surface 10*c* of fixing portion 8 is formed parallel to lower surface 10*c* of fixing portion 8.

Case 20 is filled with filling resin 7 such that non-contact region 18 is embedded.

As described above, lower surface 10 of fixing portion 8 of insulating member 6 provided to capacitor element 2 and upper surface 22 of support portion 21 formed on case 20 are brought into contact with each other at two contact portions 16, 17. With such a configuration, even when a projection exists in a portion of lower surface 10 of fixing portion 8 or upper surface 22 of support portion 21, or warping occurs on upper surface 22 of support portion 21 or lower surface 10 of fixing portion 8, fixing portion 8 can be placed on support portion 21 in a stable manner without being adversely affected by the projection or the warping. As a result, capacitor element 2 can be firmly fixed in case 20, and capacitor element 2 and terminals 4, 5 which are connected to the external mounting body can be disposed at predetermined positions with high accuracy.

Two contact portions, which are contact portion 16 between lower surface 10*a* at one end side of fixing portion 8 and upper surface 22*a* at one end side of support portion 21 and contact portion 17 between lower surface 10*b* at the other end side of fixing portion 8 and upper surface 22*b* at the other end side of support portion 21, are respectively positioned so as to never fail to sandwich the lengthwise center portion of lower surface 10 of fixing portion 8 without being offset to one side in lengthwise. With such a configuration, fixing portion 8 can be placed on support portion 21 in a stable manner, and a fixing strength of capacitor element 2 in case 20 can be further increased.

Lower surface 10*c* of fixing portion 8 which forms non-contact region 18, in which lower surface 10 of fixing portion 8 and upper surface 22 of support portion 21 are not in direct contact with each other, is inclined with respect to bottom surface 29 on an outer side of case 20 such that a lower surface 10*a* side of fixing portion 8 is disposed above a lower surface 10*b* side of fixing portion 8. With such a configuration, compared to a case where lower surface 10c of fixing portion 8 is not inclined with respect to bottom surface 29 of case 20, air existing in non-contact region 18 together along with elevation of a liquid surface of filling resin 7 at the time of filling case 20 with filling resin 7 is easily released upward along the inclination of lower surface 10c of the fixing portion 8, so that air pockets minimally occur on a lower surface 10c portion of fixing portion 8. As a result, non-contact region 18 is uniformly filled with filling resin 7, and a strength of fixing capacitor element 2 to the inside of case 20 can be further increased.

As a method of fixing insulating member 6 on which fixing portion 8 is formed and terminals 4, 5 to each other, as illustrated in FIG. 3, engaging portion 14 having a protruding shape may be formed on fixing portion 8. And a hole or engaged portion 15 having a recess shape may be formed on terminals 4, 5. And then engaged portion 14 and engaging portion 15 may be engaged with each other.

With such a configuration, insulating member 6 and terminals 4, 5 are firmly engaged with each other and hence, the fixing strength of terminals 4, 5 to insulating member 6 and the accuracy in arrangement position of terminals 4, 5 can be further improved.

Further, by forming cutouts 26, 27 at an upper end portion of support portion 21, a size of a lower end of fixing portion 8 may be set smaller than a size of an upper end of support portion 21. Each of the size of the lower end of fixing portion 8 and the size of the upper end of support portion 21 means a widthwise distance at a side wall of the case 20. With such a configuration, fitting of fixing portion 8 to support portion 21 can be smoothly performed and hence, decrease in fixing strength due to fitting failure can be prevented.

Second Exemplary Embodiment

Figure 5:
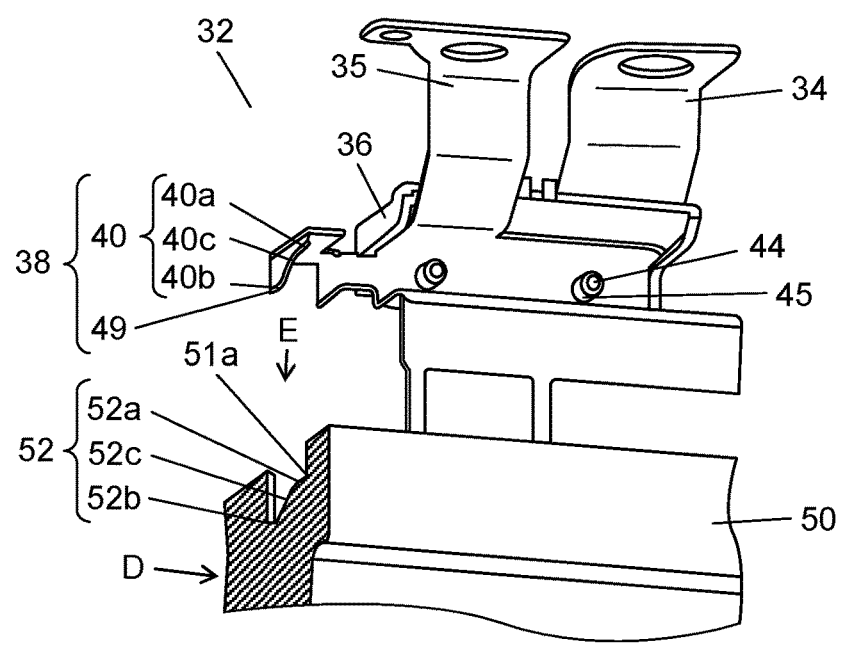
FIG. 5 is a view illustrating a cross section of a case according to a second exemplary embodiment of the present disclosure obtained by cutting a part of the case, and a fixing portion of a capacitor element.
Figure 6:
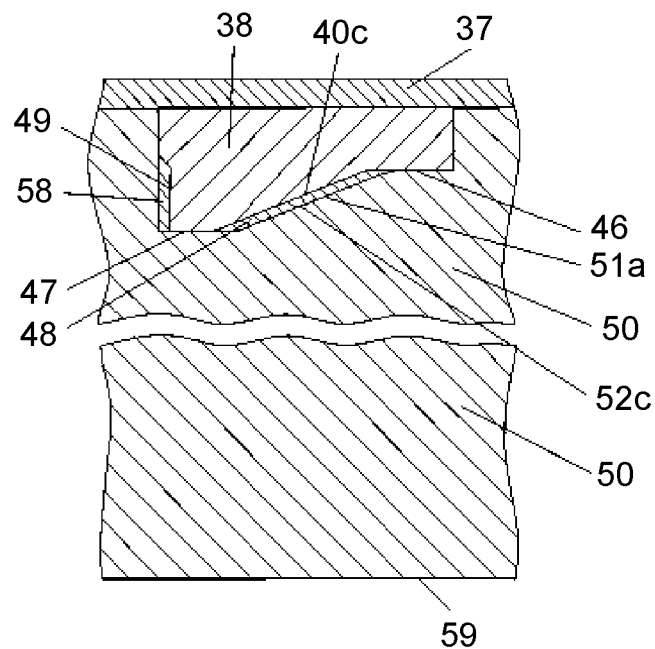
FIG. 6 is a view illustrating a cross section where the fixing portion of the capacitor element illustrated in FIG. 5 is fitted in a support portion of the case as viewed in a direction indicated by arrow D.

FIG. 5 is a view illustrating a cross section of a case according to a second exemplary embodiment of the present disclosure obtained by cutting a part of the case, and fixing portion 38 of capacitor element 32. FIG. 6 is a view illustrating a cross section where fixing portion 38 of capacitor element 32 illustrated in FIG. 5 is fitted in a support portion of case 50 as viewed in a direction indicated by arrow D.

The second exemplary embodiment has the same configuration as the first exemplary embodiment except that fixing portion 38 is formed at an end portion of terminal 35 integrally with terminal 35, that cutout 49 is formed in the vicinity of a lower end of fixing portion 38, and that no cutout is formed at an upper end portion of support portion 51a of case 50. Accordingly, in the second exemplary embodiment, the description for parts identical with the corresponding parts in the first exemplary embodiment is partially omitted.

As illustrated in FIG. 5 and FIG. 6, fixing portion 38 is formed at an end portion of terminal 35, which is extended, provided to capacitor element 32.

Capacitor element 32 is disposed at a predetermined position in case 50 by fitting fixing portion 38 (only a left end of fixing portion 38 being illustrated in FIG. 5), which is provided on both end portions of terminal 35, to support portion 51a formed at an upper end portion of a side wall of case 50. Portions of terminals 34, 35 to be connected with an external mounting body are also disposed at predetermined positions in case 50. Terminals 34, 35 are provided to capacitor element 32.

Support portion 51a formed on case 50 has upper surface 52 which faces lower surface 40 of fixing portion 38.

Fixing portion 38 is fitted in support portion 51a in a direction indicated by arrow E. Lower surface 40a located at one end side in lower surface 40 of fixing portion 38 is in direct contact with upper surface 52a located at one end side in support portion 51a at contact portion 46. And lower surface 40b located at the other end side in lower surface 40 of fixing portion 38 is in direct contact with upper surface 52b located at the other end side in support portion 51a at contact portion 47. Two contact portions, that is, contact portion 46 and contact portion 47 are positioned so as to sandwich a lengthwise center portion of lower surface 40 of fixing portion 38 (lengthwise means a lateral direction in FIG. 6). And a region sandwiched between two contact portions 46, 47 is non-contact region 48 where lower surface 40c of fixing portion 38 and upper surface 52c of support portion 51a are not in direct contact with each other.

Lower surface 40c of fixing portion 38 which defines non-contact region 48 is inclined with respect to bottom surface 59 of case 50 at an outer side thereof. Lower surface 40c is inclined such that a side of lower surface 40c near a lower surface 40a of fixing portion 38 is disposed above a side of lower surface 40c near a lower surface 40b of fixing portion 8.

Case 50 is filled with filling resin 37 such that non-contact region 48 is embedded.

With the above-mentioned configuration, a portion of terminal 35 is directly fixed to case 50 and hence, the accuracy in arrangement position of terminals 34, 35 can be further enhanced in addition to advantageous effects acquired by the first exemplary embodiment.

By forming cutout 49 at a lower end portion of fixing portion 38, a size of a lower end of fixing portion 38 may be set smaller than a size of an upper end of support portion 51a. Each of the size of the lower end of fixing portion 38 and the size of the upper end of support portion 51a means a widthwise distance at a side wall of the case 50. With such a configuration, fitting of fixing portion 38 to support portion 51a can be smoothly performed and hence, decrease in the fixing strength due to fitting failure can be prevented.

In this exemplary embodiment, two fixing portions 38 are formed on both end portions of terminal 35, respectively. However, out of two fixing portions 38, one fixing portion 38 may be formed on an end portion of terminal 35, and the other fixing portion 38 may be formed on an end portion of terminal 34 which differs from terminal 35 in polarity.

Third Exemplary Embodiment

In a third exemplary embodiment, the description for parts identical with the corresponding parts in the first exemplary embodiment is partially omitted.

Figure 7:
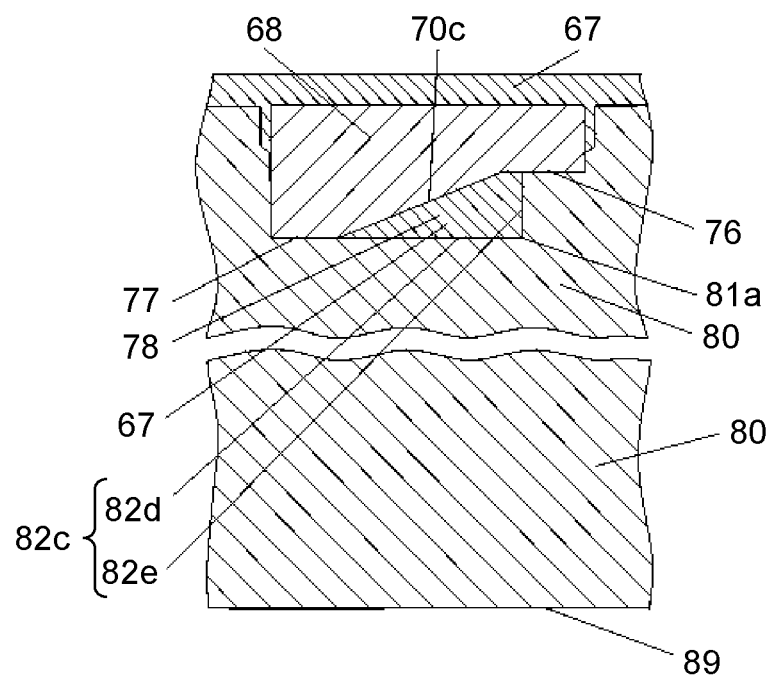
FIG. 7 is a view illustrating a cross section where a fixing portion of a capacitor element according to a third exemplary embodiment of the present disclosure is fitted in a support portion of a case.

FIG. 7 is a view illustrating a cross section where fixing portion 68 of a capacitor element according to the third exemplary embodiment of the present disclosure is fitted in a support portion of a case.

As illustrated in FIG. 7, this exemplary embodiment differs from the first exemplary embodiment in a configuration described below. Upper surface 82c of support portion 81a formed at an upper end portion of a side wall of case 80, which defines non-contact region 78, includes two surfaces, that is, upper surface 82d and upper surface 82e. Upper surface 82d is substantially parallel to bottom surface 89 of case 80 at an outer side thereof, and faces lower surface 70c of fixing portion 68. And upper surface 82e is substantially perpendicular to upper surface 82d, and is formed in a raised manner from upper surface 82d toward an upper side of case 80. Further, upper surface 82c of support portion 81a is not parallel to lower surface 70c of fixing portion 68 in a width direction of the side wall of case 80 (in a lateral direction in FIG. 7). Lower surface 70c faces upper surface 82c.

With such a configuration, compared to the configuration of the first exemplary embodiment where the upper surface of support portion 21 and the lower surface of fixing portion 8, which define the non-contact region, are parallel to each other, a contact area between case 80 and filling resin 67 that is filled in non-contact region 78 can be increased. And thus a bonding strength between filling resin 67 and case 80 is increased. As a result, a fixing strength of the capacitor element can be further increased in addition to advantageous effects acquired by the first exemplary embodiment.

In this exemplary embodiment, upper surface 82c of support portion 81a includes upper surface 82d which is formed substantially parallel to bottom surface 89 of case 80 at an outer side thereof, and upper surface 82e which is formed substantially perpendicular to upper surface 82d in a raised manner from upper surface 82d toward an upper side of case 80. With such a configuration, filling resin 67 filled in the non-contact region is in contact with two surfaces which differ from each other in angle by approximately 90 degrees. As a result, a fixing strength of the capacitor element can be further increased.

Fourth Exemplary Embodiment

In a fourth exemplary embodiment, the description for parts identical with the corresponding parts in the first exemplary embodiment is partially omitted.

Figure 8:
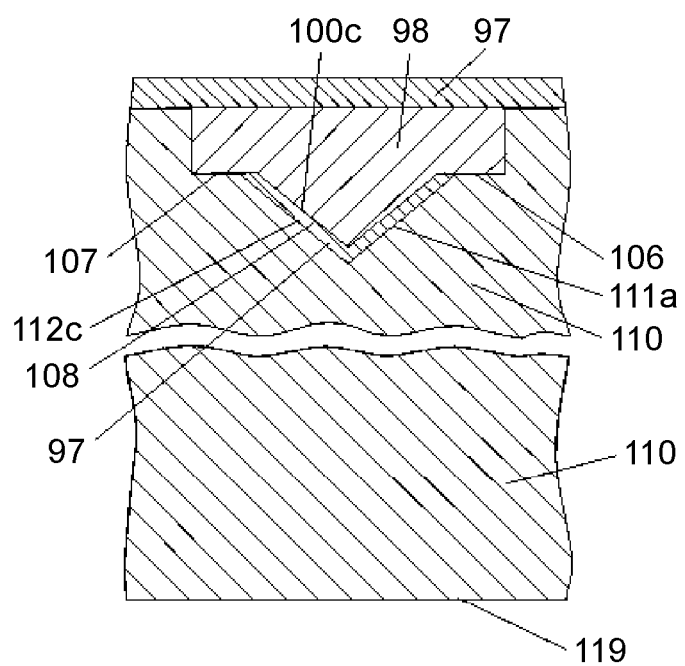
FIG. 8 is a view illustrating a cross section where a fixing portion of a capacitor element according to a fourth exemplary embodiment of the present disclosure is fitted in a support portion of a case.
Figure 9A:
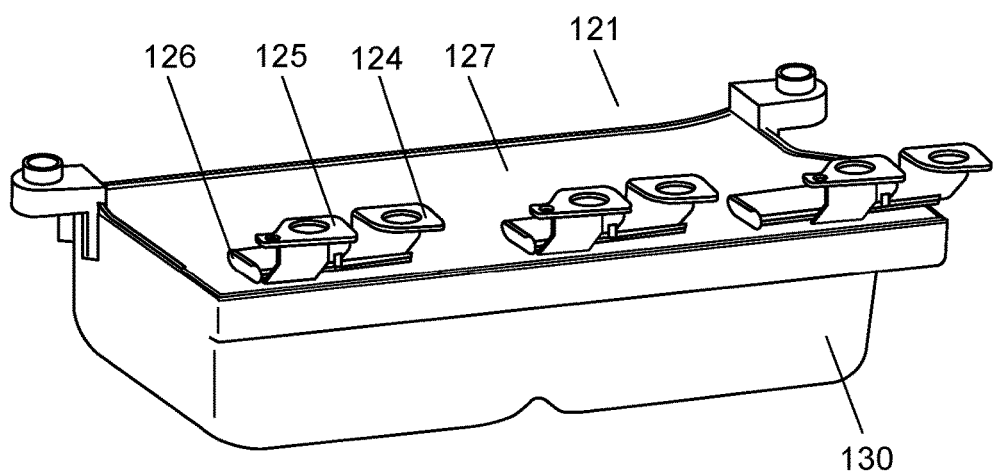
FIG. 9A is a perspective view illustrating an external appearance of a conventional film capacitor.
Figure 9B:
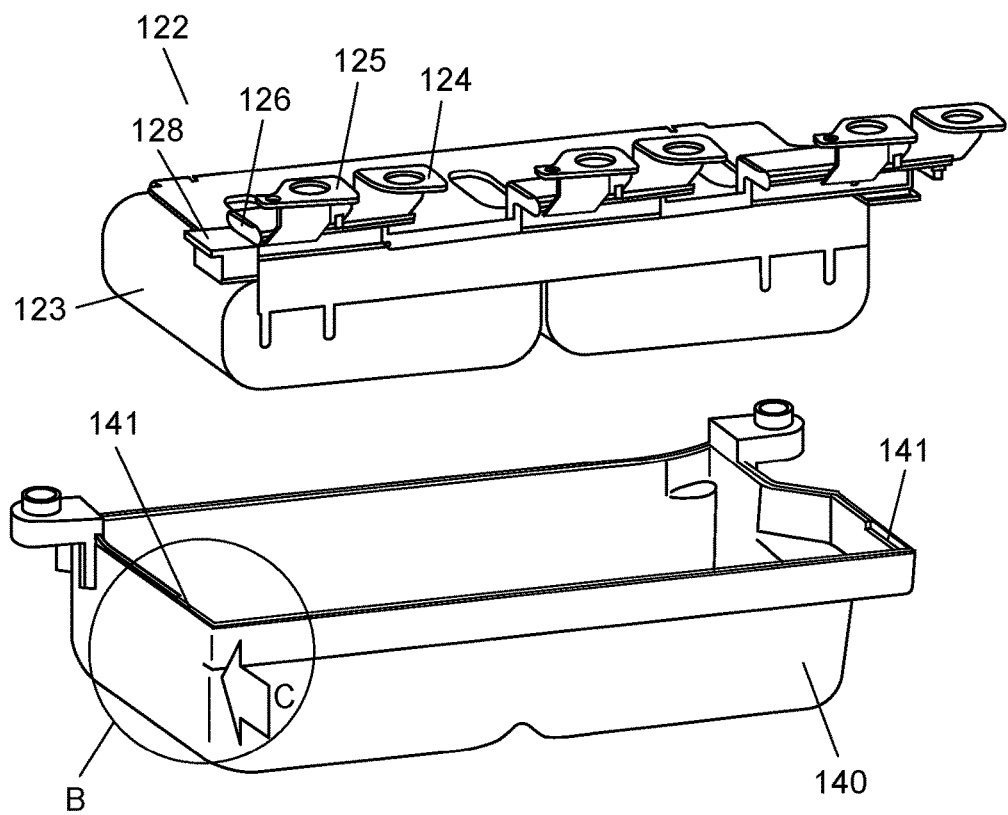
FIG. 9B is a perspective view illustrating a configuration of a conventional capacitor element and a case.
Figure 10:
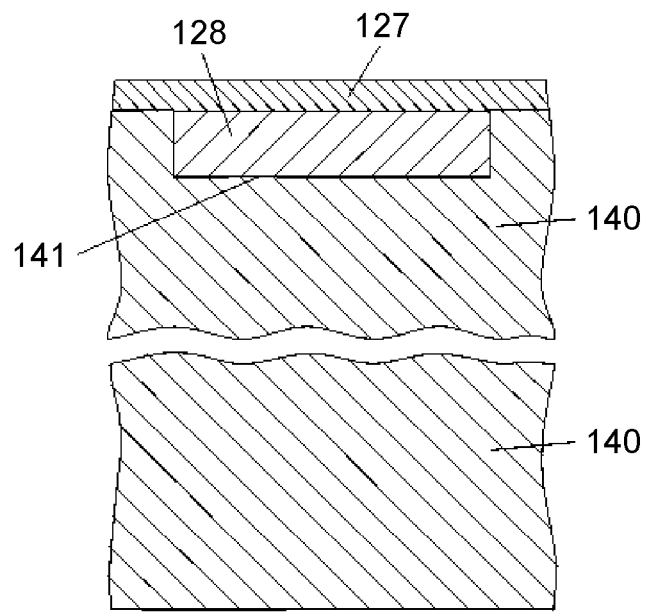
FIG. 10 is a view illustrating a cross section where a fixing portion of the capacitor element of the conventional film capacitor is fitted in a support portion of a case.

FIG. 8 is a view illustrating a cross section where fixing portion 98 of a capacitor element according to the fourth exemplary embodiment of the present disclosure is fitted in a support portion of case 110.

As illustrated in FIG. 8, this exemplary embodiment differs from the first exemplary embodiment in that lower surface 100c of fixing portion 98 provided to the capacitor element, which defines non-contact region 108, is formed in a V shape.

With such a configuration, compared to the configuration of the first exemplary embodiment where lower surface 10c of fixing portion 8 is inclined in one direction, an inclination angle of lower surface 100c can be increased. Thus, air existing in non-contact region 108 is easily released upward along the inclination of lower surface 100c of fixing portion 98 along with elevation of a liquid surface of filling resin 97 at the time of filling case 110 with filling resin 97. Accordingly, air pockets are unlikely to occur in a vicinity of lower surface 100c of fixing portion 98. As a result, a strength of fixing the capacitor element in case 110 can be further increased.

As described heretofore, according to the present disclosure, it is possible to provide an electronic device in which a device element is firmly fixed in a case, and which has excellent size accuracy in arrangement position of a terminal to be connected to an external mounting body.

The present disclosure is applicable to an electronic device where a device element is housed in a case, the electronic device being used in various electronic equipment, electric equipment, industrial equipment, electric components in automobiles and the like.

What is claimed is:

1. An electronic device comprising:
a case;
a device element housed in the case; and
a filling resin with which the case is filled so as to embed the device element in the filling resin, wherein:
the device element includes a fixing portion that fixes the device element to the case,
the case has a support portion that supports the fixing portion, the support portion having an upper surface which faces a lower surface of the fixing portion,
the fixing portion and the support portion are in contact with each other at two contact portions in the lower surface of the fixing portion, the two contact portions sandwiching a lengthwise center portion of the lower surface of the fixing portion,
a non-contact region where the fixing portion and the support portion are not in contact with each other is provided between the lower surface of the fixing portion and the upper surface of the support portion, other than the two contact portions,
at least a part of the lower surface of the fixing portion is inclined with respect to a bottom surface of the case, and
the non-contact region is embedded in the filling resin.

2. The electronic device according to claim 1, wherein:
the device element includes a terminal, and
the terminal includes the fixing portion.

3. The electronic device according to claim 1, wherein:
the device element includes two terminals which have different polarities from each other, and an insulating member interposed between the two terminals, and
the insulating member includes the fixing portion.

4. The electronic device according to claim 3, wherein the fixing portion is disposed on each of both lengthwise end portions of the insulating member.

5. The electronic device according to claim 3, wherein:
the insulating member includes an engaging portion, and
the engaging portion is engaged with an engaged portion provided in each of the two terminals so that the insulating member and the two terminals are fixed to one another.

6. The electronic device according to claim 1, wherein a size of a lower end of the fixing portion is smaller than a size of an upper end of the support portion, the size of the lower end and the size of the upper end being widthwise distance at a side wall of the case.

* * * * *